US012615086B2

(12) United States Patent     (10) Patent No.:   US 12,615,086 B2
Li et al.                (45) Date of Patent:        Apr. 28, 2026

(54) METHOD AND DEVICE FOR SUPPRESSING INTERFERENCE FADING NOISE OF OPTICAL FIBRE SENSING DATA

(71) Applicants: China National Petroleum Corporation, Beijing (CN); BGP Inc., China National Petroleum Corporation, Hebei (CN)

(72) Inventors: Yanpeng Li, Hebei (CN); Yuanzhong Chen, Hebei (CN); Fei Li, Hebei (CN); Junjun Wu, Hebei (CN)

(73) Assignees: China National Petroleum Corporation, Beijing (CN); BGP Inc., China National Petroleum Corporation, Hebei (CN)

( * ) Notice: Subject to any disclaimer, the term of this patent is extended or adjusted under 35 U.S.C. 154(b) by 322 days.

(21) Appl. No.: 18/287,209

(22) PCT Filed: Jun. 30, 2022

(86) PCT No.: PCT/CN2022/102944
§ 371 (c)(1),
(2) Date: Oct. 17, 2023

(87) PCT Pub. No.: WO2023/123972
PCT Pub. Date: Jul. 6, 2023

(65) Prior Publication Data
US 2024/0204872 A1     Jun. 20, 2024

(30) Foreign Application Priority Data
Dec. 30, 2021    (CN) .......................... 202111654292.7

(51) Int. Cl.
*H04B 10/07*       (2013.01)
*G01D 5/353*      (2006.01)
(Continued)

(52) U.S. Cl.
CPC ..... *H04B 10/2537* (2013.01); *G01D 5/35361* (2013.01); *G01H 9/004* (2013.01);
(Continued)

(58) Field of Classification Search
CPC .. H04B 10/2537; H04B 10/071; H04B 10/07; H04B 10/2507; G01D 5/35361;
(Continued)

(56) References Cited

U.S. PATENT DOCUMENTS 6,856,401 B1 * 2/2005 Rønnekleiv ............ G01D 5/344
356/477
2016/0252651 A1 * 9/2016 Ellmauthaler ........... G01V 1/48
356/72
(Continued)

FOREIGN PATENT DOCUMENTS

CN      110048765 A     7/2019
CN      110207804 A     9/2019
(Continued)

OTHER PUBLICATIONS

Fan et al, CN110207804A, Sep. 2019, Chinese published patent application, All Document. (Year: 2019).*
(Continued)

*Primary Examiner* — Dibson J Sanchez
(74) *Attorney, Agent, or Firm* — Sughrue Mion, PLLC

(57) ABSTRACT

A method and device for suppressing interference fading noise of optical fibre sensing data are disclosed. The method contains acquiring optical fibre sensing data not subjected to interference fading noise suppression; determining a fading point amplitude threshold based on the optical fibre sensing data; determining a signal fading point based on the fading point amplitude threshold; performing signal interpolation processing on the optical fibre sensing data corresponding to the signal fading point to obtain a signal subjected to
(Continued)

interference fading noise suppression; performing phase demodulation and phase unwrapping processing on the signal subjected to interference fading noise suppression to obtain processed optical fibre sensing data.

8 Claims, 6 Drawing Sheets

(51) Int. Cl.

| | |
|---|---|
| *G01H 9/00* | (2006.01) |
| *H04B 10/071* | (2013.01) |
| *H04B 10/2537* | (2013.01) |
| *G01M 11/00* | (2006.01) |
| *H04B 10/2507* | (2013.01) |

(52) U.S. Cl.
CPC ....... *H04B 10/071* (2013.01); *G01M 11/3109* (2013.01); *H04B 10/07* (2013.01); *H04B 10/2507* (2013.01)

(58) Field of Classification Search
CPC .... G01D 5/35358; G01H 9/004; G01V 1/208; G01V 2210/22; G01V 2210/30; G01V 1/226; G01V 1/36; G01V 2210/32; Y02D 30/70; G01M 11/3109
USPC ...................................................... 398/9–38

See application file for complete search history.

(56) References Cited

U.S. PATENT DOCUMENTS

| | | | | |
|---|---|---|---|---|
| 2017/0183959 | A1* | 6/2017 | Ellmauthaler | ......... G01V 1/226 |
| 2017/0235006 | A1* | 8/2017 | Ellmauthaler | ......... G01V 1/226 |
| | | | | 702/6 |
| 2019/0353029 | A1* | 11/2019 | Barfoot | ............... G01M 5/0025 |
| 2020/0182685 | A1* | 6/2020 | He | .......................... G01H 9/004 |
| 2020/0370950 | A1* | 11/2020 | Ip | ........................ G01B 9/02015 |
| 2022/0221314 | A1 | 7/2022 | Wakisaka et al. | |
| 2023/0273092 | A1* | 8/2023 | Zhang | .................... G01H 9/004 |
| | | | | 356/73.1 |
| 2023/0314188 | A1* | 10/2023 | Zhang | ............... G01D 5/35358 |
| | | | | 250/227.14 |
| 2023/0417534 | A1* | 12/2023 | Sobolewski | ........... G01H 9/004 |

FOREIGN PATENT DOCUMENTS

| | | |
|---|---|---|
| CN | 110487389 A | 11/2019 |
| CN | 112747815 A | 5/2021 |
| JP | 05-240699 A | 9/1993 |
| WO | 2020/234989 A1 | 11/2020 |

OTHER PUBLICATIONS

Fan 2 et al, DUI Algorithm for improving the dynamic range of fiber optic distributed acoustic sensor, Oct. 2020, ACP/IPOC, All Document. (Year: 2020).*
Extended European Search Report dated Aug. 16, 2024, issued in European Application No. 22913261.8.
International Search Report for PCT/CN2022/102944 dated Sep. 8, 2022 (PCT/ISA/210).

* cited by examiner

METHOD AND DEVICE FOR SUPPRESSING INTERFERENCE FADING NOISE OF OPTICAL FIBRE SENSING DATA

CROSS REFERENCE TO RELATED APPLICATIONS

This application is a National Stage of International Application No. PCT/CN2022/102944 filed Jun. 30, 2022, claiming priority based on Chines Patent Application No. 202111654292.7 filed Dec. 30, 2021.

FIELD OF THE INVENTION

The present disclosure relates to the technical field of optical fibre sensing data processing, in particular to a method and device for suppressing interference fading noise of optical fibre sensing data, a processor, and a computer-readable storage medium.

BACKGROUND OF THE INVENTION

With the continuous development of science and technology, the optical fibre sensing technology is continuously applied to various fields in life and production. The optical fibre distributed acoustic sensing technology is a detection technology based on Rayleigh scattering principle of an optical fibre, and is widely used in the technical fields of borehole seismic data acquisition, dam safety monitoring, security and the like.

In the application process, the vibration information around the optical fibre is acquired through phase demodulation. As a sensing medium and a transmission medium, the optical fibre can continuously sense the acoustic vibration information around the optical fibre, and record the related vibration or strain data through high-density time and space sampling.

In the prior art, the optical fibre distributed acoustic sensing technology generally adopts a phase-sensitive optical time domain reflectometer, and the phase information of Rayleigh scattering is obtained through in-phase and quadrature-phase demodulation. However, in the practical application process, because the light intensity and phase of Rayleigh scattering have random statistical characteristics in space and time, interference fading will lead to inconsistent phase noise levels of data collected at different positions, so when the intensity of Rayleigh scattering at some positions is weak due to interference fading, the phase demodulation signal will submerge the effective signal due to too high phase noise, which cannot realise the accurate detection of external signals, thus greatly reducing the accuracy of optical fibre sensing and causing great trouble to technicians.

SUMMARY OF THE INVENTION

In order to overcome the above technical problems existing in the prior art, embodiments of the present disclosure provide a method for suppressing interference fading noise of optical fibre sensing data, which analyses the original optical fibre sensing data and determines the corresponding signal fading point, and automatically supplements the fading point for the optical fibre sensing data through linear interpolation of adjacent normal points according to the signal fading point, thereby obtaining the optical fibre sensing data overcoming the interference fading, and improving the accuracy of optical fibre sensing data collection.

In order to achieve the above object, an embodiment of the present disclosure provides a method for suppressing interference fading noise of optical fibre sensing data, comprising: acquiring optical fibre sensing data not subjected to interference fading noise suppression; determining a fading point amplitude threshold based on the optical fibre sensing data; determining a signal fading point based on the fading point amplitude threshold; performing signal interpolation processing on the optical fibre sensing data corresponding to the signal fading point to obtain a signal subjected to interference fading noise suppression; and performing phase demodulation and phase unwrapping processing on the signal subjected to interference fading noise suppression to obtain processed optical fibre sensing data.

Preferably, an optical fibre is disposed at a detected position, and acquiring the optical fibre sensing data not subjected to interference fading noise suppression comprises: acquiring initial optical fibre sensing data detected at the detected position; performing a direct current offset correction operation and an amplitude and phase imbalance correction on the initial optical fibre sensing data to obtain corrected optical fibre sensing data; and taking the corrected optical fibre sensing data as the optical fibre sensing data not subjected to interference fading noise suppression.

Preferably, determining the fading point amplitude threshold based on the optical fibre sensing data comprises: determining a preset reference position; determining, among the optical fibre sensing data, at least one set of reference optical fibre sensing data within a preset range of the preset reference position; generating a corresponding amplitude-phase diagram based on the at least one set of reference optical fibre sensing data; determining phase divergence information of the at least one set of reference optical fibre sensing data based on the amplitude-phase diagram; and determining the fading point amplitude threshold based on the phase divergence information.

Preferably, determining the signal fading point based on the fading point amplitude threshold comprises: comparing the amplitude of each optical fibre sensing data with the fading point amplitude threshold in turn; determining a point corresponding to the optical fibre sensing data of which the amplitude is smaller than the fading point amplitude threshold as a signal fading point, and determining a point corresponding to the optical fibre sensing data of which the amplitude is greater than the fading point amplitude threshold as a normal point.

Preferably, performing signal interpolation processing on the optical fibre sensing data corresponding to the signal fading point to obtain a signal subjected to interference fading noise suppression comprises: performing signal interpolation processing on all fading points by an adjacent normal point interpolation method to obtain a signal subjected to interference fading noise suppression.

Correspondingly, the present disclosure further provides a device for suppressing interference fading noise of optical fibre sensing data, comprising: an optical fibre sensing data acquisition unit, used for acquiring optical fibre sensing data not subjected to interference fading noise suppression; a threshold determination unit, used for determining a fading point amplitude threshold based on the optical fibre sensing data; a fading point determination unit, used for determining a signal fading point based on the fading point amplitude threshold; a fading noise elimination unit, used for performing signal interpolation processing on the optical fibre sensing data corresponding to the signal fading point to obtain a signal subjected to interference fading noise suppression; and a subsequent processing unit, used for performing phase demodulation and phase unwrapping processing on the signal subjected to interference fading noise suppression to obtain processed optical fibre sensing data.

Preferably, an optical fibre is disposed at a detected position, and the optical fibre sensing data acquisition unit comprises: an initial optical fibre sensing data acquisition module, used for acquiring initial optical fibre sensing data at the detected position; a data correction module, used for performing a direct current offset correction operation and an amplitude and phase imbalance correction on the initial optical fibre sensing data to obtain corrected optical fibre sensing data; and a data determination module, used for taking the corrected optical fibre sensing data as the optical fibre sensing data not subjected to interference fading noise suppression.

Preferably, the threshold determination unit comprises: a reference position determination module, used for determining a preset reference position; a reference information determination module, used for determining, among the optical fibre sensing data, at least one set of reference optical fibre sensing data within a preset range of the preset reference position; a cross plot generation module, used for generating a corresponding amplitude-phase diagram based on the at least one set of reference optical fibre sensing data; a phase divergence information determination module, used for determining phase divergence information of the at least one set of reference optical fibre sensing data based on the amplitude-phase diagram; and a threshold determination module, used for determining a fading point amplitude threshold based on the phase divergence information.

Preferably, the fading point determination unit comprises: a comparison module, used for comparing the amplitude of each optical fibre sensing data with the fading point amplitude threshold in turn; a fading point determination module, used for a point corresponding to the optical fibre sensing data of which the amplitude is smaller than the fading point amplitude threshold as a signal fading point, and determining a point corresponding to the optical fibre sensing data of which the amplitude is greater than the fading point amplitude threshold as a normal point.

Preferably, the fading noise elimination unit is used for performing signal interpolation processing on all fading points by an adjacent normal point interpolation method to obtain a signal subjected to interference fading noise suppression.

In another aspect, the present disclosure also provides a processor, configured to perform the method for suppressing interference fading noise of optical fibre sensing data provided by the present disclosure.

In another aspect, the present disclosure also provides a computer-readable storage medium, storing a computer program therein, wherein the computer program, when executed by a processor, implements the method for suppressing interference fading noise of optical fibre sensing data provided by the present disclosure.

Through the technical solution provided by the present disclosure, the present disclosure has at least the following technical effects:

in the process of collecting optical fibre sensing data, by analysing the collected original optical fibre sensing data, determining the signal fading point corresponding to the optical fibre sensing data by determining the fading point amplitude threshold, and performing adjacent normal point interpolation on the original optical fibre sensing data according to the signal fading point for suppressing the fading noise of the optical fibre sensing data, the problem of interference fading noise of the optical fibre sensing data in the collecting process is overcome, the accuracy of the collected optical fibre sensing data is improved, and the actual demands of technicians are satisfied. Other features and advantages of embodiments of the present disclosure will be described in detail in the Detailed Description section that follows.

BRIEF DESCRIPTION OF DRAWINGS

The accompanying drawings are intended to provide a further understanding of the embodiments of the present disclosure and constitute a part of this specification, and together with the detailed description below serve to explain, but not to limit, the embodiments of the present disclosure. In the drawings.

DETAILED DESCRIPTION OF THE EMBODIMENTS

The specific implementations of the embodiments of the present disclosure will be described in detail with reference to the accompanying drawings. It should be understood that the specific implementations described here are only used to illustrate and explain the embodiments of the present disclosure, and are not used to limit the embodiments of the present disclosure.

The terms "system" and "network" in the embodiments of the present disclosure can be used interchangeably. "plurality of" means two or more, and in view of this, "plurality of" can also be understood as "at least two" in the embodiments of the present disclosure. "and/or", which describes the association relationship of associated objects, indicates that three relationships can exist, for example, A and/or B, which can mean that A exists alone, A and B exist together, and B exists alone. In addition, the character "/", unless otherwise specified, generally indicates that the associated objects before and after the "/" are in an "OR" relationship. In addition, it should be understood that in the description of the embodiments of the present disclosure, words such as "first" and "second" are only used for the purpose of distinguishing descriptions, and cannot be understood as indicating or implying relative importance, nor can they be understood as indicating or implying the order.

Figure 1:
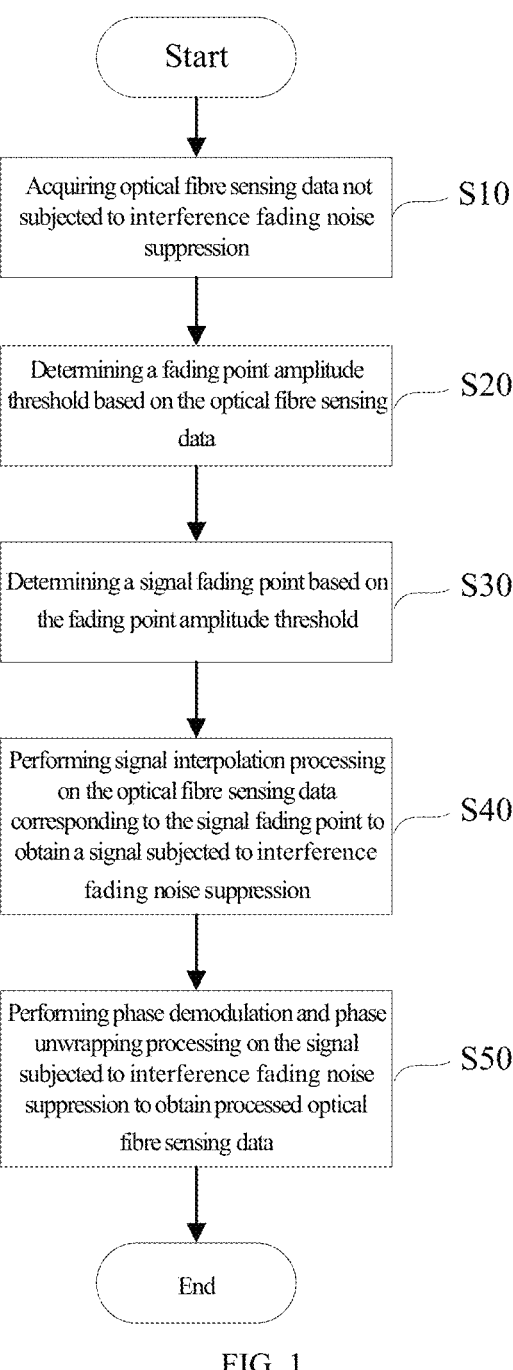
FIG. 1 is a specific implementation flowchart of a method for suppressing interference fading noise of optical fibre sensing data according to an embodiment of the present disclosure.

Referring to FIG. 1, an embodiment of the present disclosure provides a method for suppressing interference fading noise of optical fibre sensing data, comprising:

S10) acquiring optical fibre sensing data not subjected to interference fading noise suppression;

S20) determining a fading point amplitude threshold based on the optical fibre sensing data;

S30) determining a signal fading point based on the fading point amplitude threshold;

S40) performing signal interpolation processing on the optical fibre sensing data corresponding to the signal fading point to obtain a signal subjected to interference fading noise suppression; and S50) performing phase demodulation and phase unwrapping processing on the signal subjected to interference fading noise suppression to obtain processed optical fibre sensing data.

Figure 2:
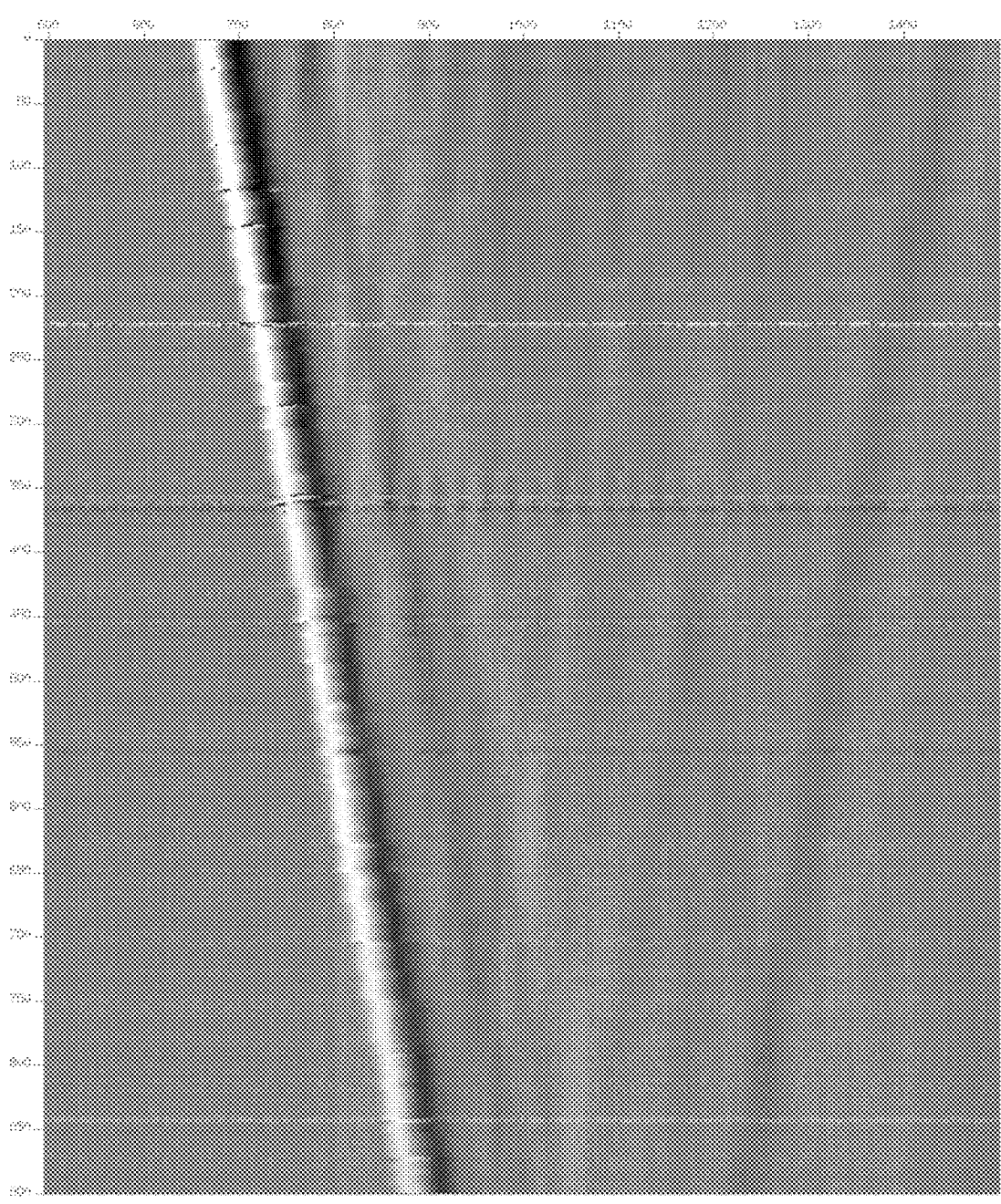
FIG. 2 is a demodulated phase diagram of DAS data not subjected to interference fading noise suppression in a method for suppressing interference fading noise of optical fibre sensing data provided by an embodiment of the present disclosure.

In the process of collecting optical fibre sensing data, an optical fibre is laid at the detected position and is subjected to sufficient coupling, and a DAS (distributed acoustic sensor) is connected to one end of the optical fibre, the DAS emits laser pulses, and an IQ (In-phase/Quadrature) signal from Rayleigh scattering of the optical pulses is obtained by a coherent detection method, and corresponding optical fibre sensing data is obtained after the signal is subjected to phase demodulation. However, in the prior art, the data obtained after phase demodulation processing is directly performed on the optical fibre sensing data has a large noise, thus practical demands of technicians cannot be met. For example, referring to FIG. 2, which is a demodulated phase diagram of DAS data not subjected to interference fading noise suppression in a method for suppressing interference fading noise of optical fibre sensing data provided by an embodiment of the present disclosure, so in order to solve the technical problems existing in the prior art, the above-mentioned obtained optical fibre sensing data is optimised.

In one possible implementation, optical fibre sensing data not subjected to interference fading noise suppression is first obtained, the optical fibre sensing device is an instrument centered on a phase-sensitive optical time domain reflectometer, and is disposed at a detected position, during acquisition of optical fibre sensing data, initial optical fibre sensing data detected at each detected position is first acquired, the initial optical fibre sensing data is the above-mentioned IQ signal, then a direct current offset correction operation and an amplitude and phase imbalance correction operation are performed on the initial optical fibre sensing data to obtain a corrected IQ signal, wherein the corrected information is output IQ information $I(i, j)$, $Q(i, j)$ at different moments and at different observation points, wherein i represents the ith sampling time of the optical fibre sensing device and j represents the serial number of the jth detected position, and the amplitude A and direct phase $\omega\_0$ of the optical fibre sensing data can be calculated according to the IQ information, and can be specifically represented as: $A(i,j)=\mathrm{sqrt}(I(i,j)*I(i,j)+Q(i,j)*Q(i,j))$, $\omega\_0(i,j)=\arctan((Q(i,j))/(I(i,j)))$. The corrected IQ signal can then be used as the optical fibre sensing data not subjected to interference fading noise suppression. The fading point amplitude threshold is then further acquired.

Figure 3:
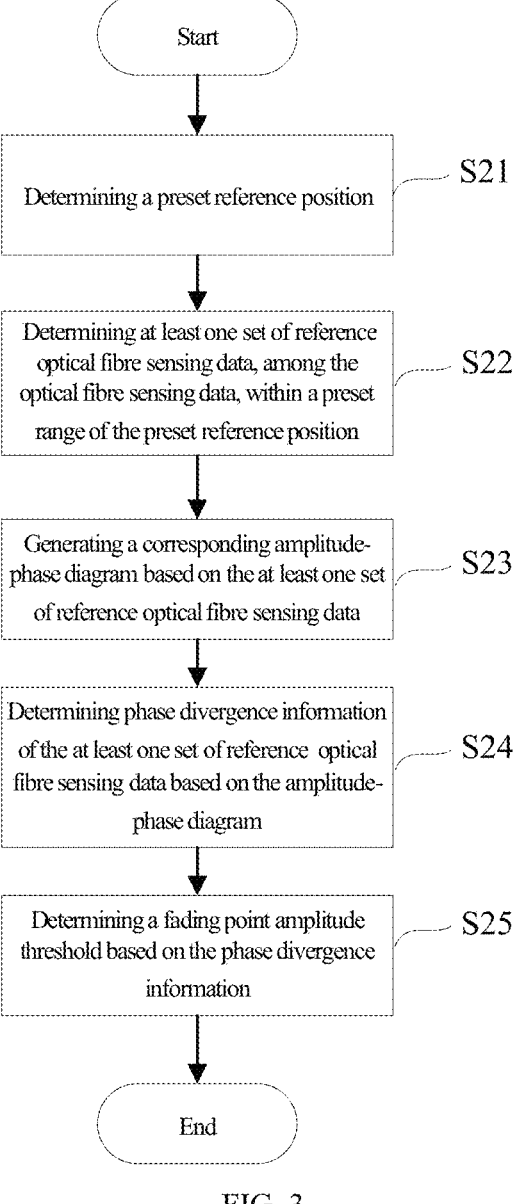
FIG. 3 is a specific implementation flowchart of determining a fading point amplitude threshold in a method for suppressing interference fading noise of optical fibre sensing data according to an embodiment of the present disclosure.

Referring to FIG. 3, in an embodiment of the present disclosure, determining the fading point amplitude threshold based on the optical fibre sensing data comprises:

S21) determining a preset reference position;

S22) determining, among the optical fibre sensing data, at least one set of reference optical fibre sensing data within a preset range of the preset reference position;

S23) generating a corresponding amplitude-phase diagram based on the at least one set of reference optical fibre sensing data;

S24) determining phase divergence information of the at least one set of reference optical fibre sensing data based on the amplitude-phase diagram; and S25) determining the fading point amplitude threshold based on the phase divergence information.

Figure 4:
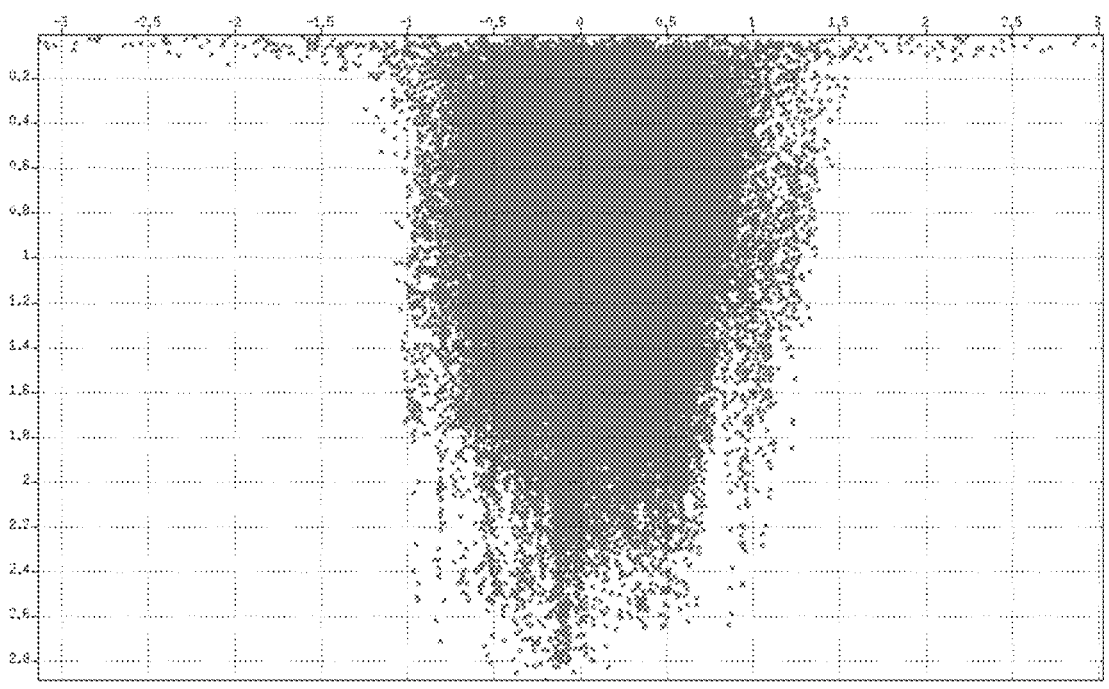
FIG. 4 is an amplitude-phase diagram of a method for suppressing interference fading noise of optical fibre sensing data according to an embodiment of the present disclosure.

In one possible embodiment, after the collected optical fibre sensing data is acquired, the optical fibre sensing data is statistically analysed. First, a preset reference position is determined, the preset reference position is a middle position j0 of the optical fibre to be measured, at this time, n depth points are determined within a preset range of the middle position j0, and at least one set of reference optical fibre sensing data of the n depth points is extracted, wherein n is a positive integer greater than 0, at this time, a corresponding amplitude-phase diagram is generated based on the amplitude A and phase $\omega$ of the optical fibre sensing data, and referring to FIG. 4, $\omega$ is the demodulated phase obtained by spatial differential or global phase demodulation based on $\omega\_0$. At this time, a phase divergence trend of all points of the amplitude-phase diagram is analysed, a region of significant phase divergence is determined in the phase divergence trend information, and a value corresponding to an intersection of the region of significant phase divergence and a region of non-significant phase divergence is determined as a fading point amplitude threshold.

Figure 5:
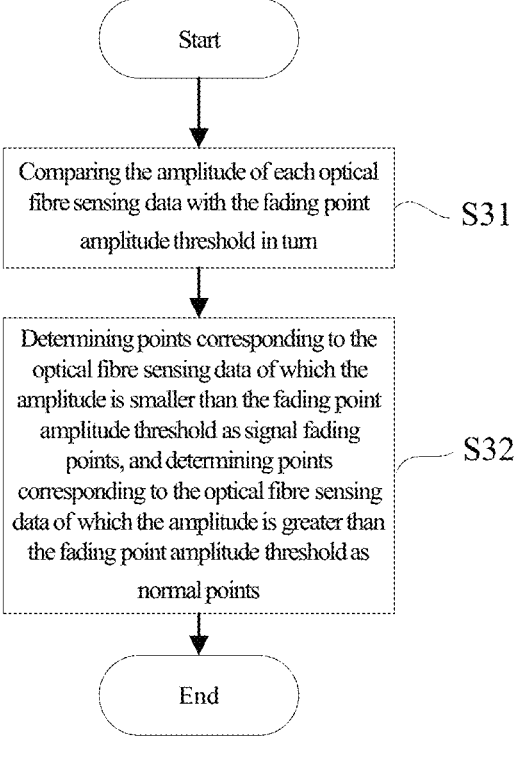
FIG. 5 is a specific implementation flowchart of determining a signal fading point in a method for suppressing interference fading noise of optical fibre sensing data according to an embodiment of the present disclosure.

In the embodiment of the present disclosure, by analysing the phase divergence trend of the optical fibre sensing data graphically, the region where the trend changes significantly can be effectively identified, thus improving the accuracy of trend analysis, and at the same time, the value corresponding to the point where the phase divergence trend changes significantly is used as the fading point amplitude threshold, so that the effect of subsequent interference fading noise suppression can be effectively improved, and the accuracy of noise suppression is improved. After the fading point amplitude threshold is determined, the signal fading point is further determined. Referring to FIG. 5, in an embodiment of the present disclosure, determining the signal fading point based on the fading point amplitude threshold comprises:

S31) comparing an amplitude of each optical fibre sensing data with the fading point amplitude threshold in turn; and S32) determining a point corresponding to the optical fibre sensing data of which the amplitude is smaller than the fading point amplitude threshold as a signal fading point, and determining a point corresponding to the optical fibre sensing data of which the amplitude is greater than the fading point amplitude threshold as a normal point.

For example, in one possible implementation, point-by-point calculation is performed on each obtained optical fibre sensing data using the fading point amplitude threshold obtained by calculation, and points corresponding to the optical fibre sensing data of which the amplitude is smaller than the fading point amplitude threshold are obtained as signal fading points, and points corresponding to the remaining information are taken as normal points. Further, the optical fibre sensing data corresponding to the signal fading points is linearly interpolated by using adjacent normal point data, thereby realising suppression on the fading noise of the optical fibre sensing data corresponding to each signal fading point.

Figure 6:
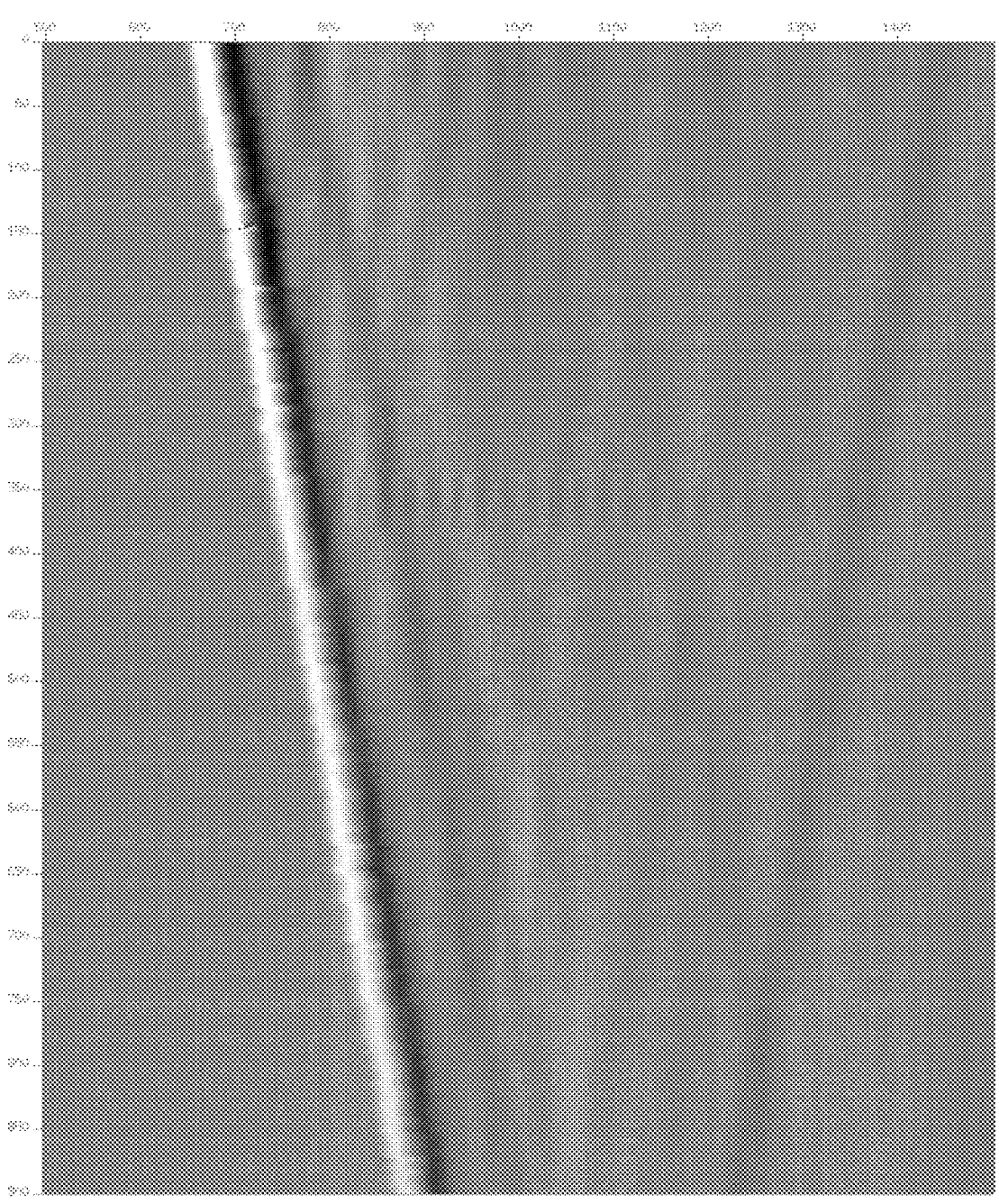
FIG. 6 is a demodulated phase diagram of DAS data subjected to interference fading noise suppression in a method for suppressing interference fading noise of optical fibre sensing data provided by an embodiment of the present disclosure.

In the embodiment of the present disclosure, in the process of collecting the optical fibre sensing data, the signal fading points are accurately identified, and the optical fibre sensing data corresponding to each signal fading point is interpolated by using adjacent normal points, thereby effectively overcoming the influence caused by interference fading on the normal optical fibre sensing data, effectively improving the accuracy of the collected optical fibre sensing data, and improving the accuracy of subsequent data analysis. After the signal is interpolated, further processing such as phase demodulation and phase unwrapping is performed, thereby obtaining the final optical fibre sensing data. Referring to FIG. 6, which is a demodulated phase diagram of DAS data subjected to interference fading noise suppression according to an embodiment of the present disclosure.

After the processed optical fibre sensing data is obtained, it is readily known to those skilled in the art that, the above steps can also be performed on optical fibre sensing data obtained by artificial seismic source excitation or microseismic monitoring according to actual needs, to obtain corresponding processed optical fibre sensing data, and more accurate optical fibre sensing data processing can be realised by combining the subsequently obtained processed optical fibre sensing data, so as to provide accurate data support for subsequent seismic data processing and calculation, and satisfy actual demands of technicians.

Hereinafter, a device for suppressing interference fading noise of optical fibre sensing data provided by an embodiment of the present disclosure will be described with reference to the accompanying drawings.

Figure 7:
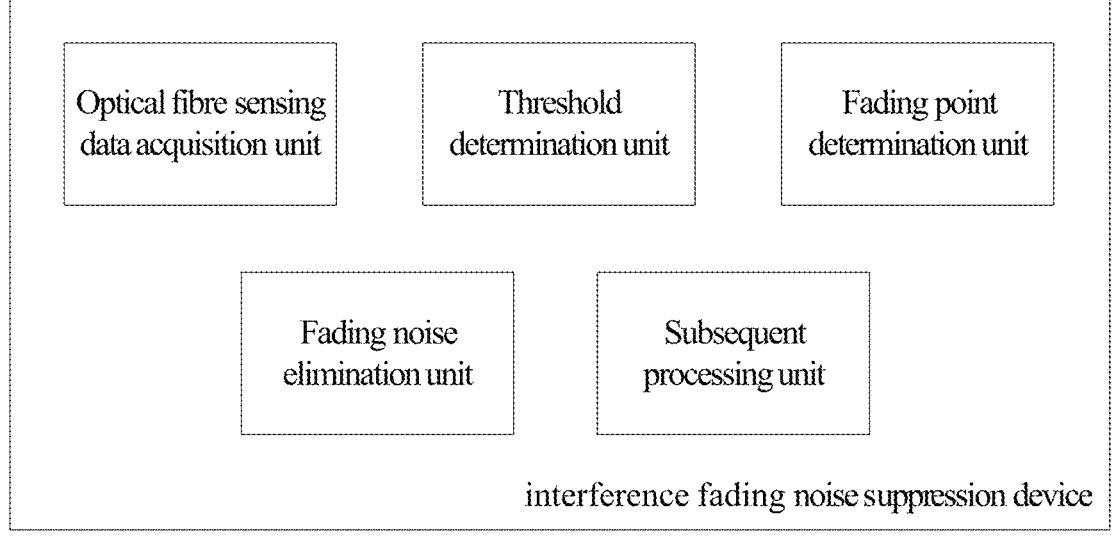
FIG. 7 is a structural schematic diagram of a device for suppressing interference fading noise of optical fibre sensing data according to an embodiment of the present disclosure.

Referring to FIG. 7, based on the same inventive concept, an embodiment of the present disclosure provides a device for suppressing interference fading noise of optical fibre sensing data, comprising: an optical fibre sensing data acquisition unit, used for acquiring optical fibre sensing data not subjected to interference fading noise suppression; a threshold determination unit, used for determining a fading point amplitude threshold based on the optical fibre sensing data; a fading point determination unit, used for determining a signal fading point based on the fading point amplitude threshold; a fading noise elimination unit, used for performing signal interpolation processing on the optical fibre sensing data corresponding to the signal fading point to obtain a signal subjected to interference fading noise suppression; and a subsequent processing unit, used for performing phase demodulation and phase unwrapping processing on the signal subjected to interference fading noise suppression to obtain processed optical fibre sensing data.

In the embodiment of the present disclosure, the optical fibre is laid at the detected position, and the optical fibre sensing data acquisition unit comprises: an initial optical fibre sensing data acquisition module, used for acquiring initial optical fibre sensing data detected at the detected position; a data correction module, used for performing a direct current offset correction operation and an amplitude and phase imbalance correction operation on the initial optical fibre sensing data to obtain corrected optical fibre sensing data; and a data determination module, used for taking the corrected optical fibre sensing data as the optical fibre sensing data not subjected to interference fading noise suppression.

In an embodiment of the present disclosure, the threshold determination unit comprises: a reference position determination module, used for determining a preset reference position; a reference information determination module, used for determining, among the optical fibre sensing data, at least one set of reference optical fibre sensing data within a preset range of the preset reference position; a cross plot generation module, used for generating a corresponding amplitude-phase diagram based on the at least one set of reference optical fibre sensing data; a phase divergence information determination module, used for determining phase divergence information of the at least one set of reference optical fibre sensing data based on the amplitude-phase diagram; and a threshold determination module, used for determining a fading point amplitude threshold based on the phase divergence information.

In the embodiment of the present disclosure, the fading point determination unit comprises: a comparison module, used for comparing an amplitude of each optical fibre sensing data with the fading point amplitude threshold in turn; and a fading point determination module, used for determining a point corresponding to the optical fibre sensing data of which the amplitude is smaller than the fading point amplitude threshold as a signal fading point, and determining a point corresponding to the optical fibre sensing data of which the amplitude is greater than the fading point amplitude threshold as a normal point.

In the embodiment of the present disclosure, the fading noise elimination unit is used for performing signal interpolation processing on all fading points by an adjacent normal point interpolation method to obtain a signal subjected to interference fading noise suppression.

Further, embodiments of the present disclosure also provide a processor, configured to perform the method for suppressing interference fading noise of optical fibre sensing data according to the present disclosure.

Further, an embodiment of the present disclosure provides a computer-readable storage medium, storing a computer program therein, wherein the computer program, when executed by a processor, implements the method for suppressing interference fading noise of optical fibre sensing data according to the present disclosure.

Optional implementations of embodiments of the present disclosure are described in detail above in conjunction with the accompanying drawings, however, the embodiments of the present disclosure are not limited to the specific details in the above implementations, and many simple variations can be made to the technical solutions of the embodiments of the present disclosure within the scope of the technical idea of the embodiments of the present disclosure, and these simple variations all belong to the protection scope of the embodiments of the present disclosure.

It needs to be further noted that the various specific features described in the above detailed description can be combined in any suitable manner without contradiction. In order to avoid unnecessary repetition, embodiments of the present disclosure will not explain any possible combinations.

Those skilled in the art will appreciate that all or part of the steps in the method for realising the embodiments described above may be performed by instructing related hardware through a program, the program is stored in a storage medium and includes instructions for causing a single-chip microcomputer, chip or processor to execute all or part of the steps of the method according to the various embodiments of the present application. The aforementioned storage medium includes a USB flash disk, a mobile hard disk, a read-only memory (ROM), a random access memory (RAM), a magnetic disk or an optical disk and other media that can store program codes.

In addition, various different implementations of the embodiments of the present disclosure can also be arbitrarily combined, as long as they do not violate the idea of the embodiments of the present disclosure, which should also be considered as the content disclosed in the embodiments of the present disclosure.

The invention claimed is:

1. A method for suppressing interference fading noise of optical fibre sensing data, comprising:

acquiring optical fibre sensing data not subjected to interference fading noise suppression;

determining a fading point amplitude threshold based on the optical fibre sensing data;

determining a signal fading point based on the fading point amplitude threshold;

performing signal interpolation processing on the optical fibre sensing data corresponding to the signal fading point to obtain a signal subjected to interference fading noise suppression; and performing phase demodulation and phase unwrapping processing on the signal subjected to interference fading noise suppression to obtain processed optical fibre sensing data, wherein the determining the fading point amplitude threshold based on the optical fibre sensing data comprises:

determining a preset reference position;

determining, among the optical fibre sensing data, at least one set of reference optical fibre sensing data within a preset range of the preset reference position;

generating a corresponding amplitude-phase diagram based on the at least one set of reference optical fibre sensing data;

determining phase divergence information of the at least one set of reference optical fibre sensing data based on the amplitude-phase diagram; and determining the fading point amplitude threshold based on the signal phase divergence information.

2. The method according to claim 1, wherein an optical fibre is disposed at a detected position, and the acquiring the optical fibre sensing data not subjected to interference fading noise suppression comprises:

acquiring initial optical fibre sensing data at the detected position;

performing a direct current offset correction operation and an amplitude and phase imbalance correction operation on the initial optical fibre sensing data to obtain corrected optical fibre sensing data; and taking the corrected optical fibre sensing data as the optical fibre sensing data not subjected to interference fading noise suppression.

3. The method according to claim 2, wherein the determining the signal fading point based on the fading point amplitude threshold comprises:

comparing an amplitude of each optical fibre sensing data with the fading point amplitude threshold in turn; and determining a point corresponding to the optical fibre sensing data of which the amplitude is smaller than the fading point amplitude threshold as a signal fading point, and determining a point corresponding to the optical fibre sensing data of which the amplitude is greater than the fading point amplitude threshold as a normal point.

4. The method according to claim 1, wherein the performing signal interpolation processing on the optical fibre sensing data corresponding to the signal fading point to obtain a signal subjected to interference fading noise suppression comprises:

performing signal interpolation processing on all fading points by an adjacent normal point interpolation method to obtain a signal subjected to interference fading noise suppression.

5. A non-transitory computer-readable storage medium storing a computer program, wherein the computer program, when executed by a processor, implements the method for suppressing interference fading noise of optical fibre sensing data according to claim 1.

6. A device for suppressing interference fading noise of optical fibre sensing data, comprising a processor and a memory storing instructions executable by the processor to perform operations including:

acquiring optical fibre sensing data not subjected to interference fading noise suppression;

determining a fading point amplitude threshold based on the optical fibre sensing data;

determining a signal fading point based on the fading point amplitude threshold;

performing signal interpolation processing on the optical fibre sensing data corresponding to the signal fading point to obtain a signal subjected to interference fading noise suppression; and performing phase demodulation and phase unwrapping processing on the signal subjected to interference fading noise suppression to obtain processed optical fibre sensing data, wherein the determining a fading point amplitude threshold comprises:

determining a preset reference position;

determining, among the optical fibre sensing data, at least one set of reference optical fibre sensing data within a preset range of the preset reference position;

generating a corresponding amplitude-phase diagram based on the at least one set of reference optical fibre sensing data;

determining phase divergence information of the at least one set of reference optical fibre sensing data based on the amplitude-phase diagram; and determining the fading point amplitude threshold based on the phase divergence information.

7. The device according to claim 6, wherein an optical fibre is disposed at a detected position, and the acquiring optical fibre sensing data not subjected to interference fading noise suppression comprises:

acquiring initial optical fibre sensing data detected at the detected position;

performing a direct current offset correction operation and an amplitude and phase imbalance correction operation on the initial optical fibre sensing data to obtain corrected optical fibre sensing data; and taking the corrected optical fibre sensing data as the optical fibre sensing data not subjected to interference fading noise suppression.

8. The device according to claim 6, wherein the performing signal interpolation processing on the optical fibre sensing data corresponding to the signal fading point to obtain a signal subjected to interference fading noise suppression comprises:

performing signal interpolation processing on all fading points by an adjacent normal point interpolation method to obtain a signal subjected to interference fading noise suppression.

* * * * *